United States Patent
Akinbobola et al.

(10) Patent No.: US 10,624,358 B2
(45) Date of Patent: Apr. 21, 2020

(54) ELECTRIC SMOKER

(71) Applicants: Victor Akinbobola, West Chester, OH (US); David H. Kohnen, Cincinnati, OH (US)

(72) Inventors: Victor Akinbobola, West Chester, OH (US); David H. Kohnen, Cincinnati, OH (US)

(73) Assignee: LEM Products Holding LLC, West Chester, OH (US)

( * ) Notice: Subject to any disclaimer, the term of this patent is extended or adjusted under 35 U.S.C. 154(b) by 366 days.

(21) Appl. No.: 15/831,903

(22) Filed: Dec. 5, 2017

(65) Prior Publication Data

US 2019/0166858 A1    Jun. 6, 2019

(51) Int. Cl.
*A23B 4/056* (2006.01)
*A23B 4/052* (2006.01)
*A47J 37/06* (2006.01)

(52) U.S. Cl.
CPC ............ *A23B 4/056* (2013.01); *A23B 4/0523* (2013.01); *A47J 37/0629* (2013.01)

(58) Field of Classification Search
CPC ..... A23B 4/056; A23B 4/0523; A47J 37/0629
See application file for complete search history.

(56) References Cited

U.S. PATENT DOCUMENTS

| | | |
|---|---|---|
| 3,139,349 A | 6/1964 | Swartz et al. |
| 3,173,357 A | 3/1965 | Nunnery |
| 3,693,534 A | 9/1972 | Martin |
| 4,355,570 A | 10/1982 | Martin et al. |
| 4,686,896 A | 8/1987 | Gordon |
| 5,719,377 A | 2/1998 | Giebel et al. |
| 6,012,382 A | 1/2000 | McLemore |
| 6,868,777 B1 | 3/2005 | Higgins et al. |
| 6,941,857 B2 | 9/2005 | McLemore |
| 7,196,291 B2 | 3/2007 | Cothran |
| 7,227,107 B2 | 6/2007 | McLemore et al. |
| 7,301,127 B1 | 11/2007 | Derridinger, Jr. |
| 7,339,137 B1 | 3/2008 | Sorenson et al. |
| 7,412,922 B2 | 8/2008 | McLemore |
| 7,703,389 B2 | 4/2010 | McLemore et al. |
| D615,798 S | 5/2010 | McLemore et al. |
| D616,243 S | 5/2010 | McLemore et al. |

(Continued)

*Primary Examiner* — Rick K Chang
(74) *Attorney, Agent, or Firm* — Taft Stettinius & Hollister LLP; Anthony P. Filomena, II

(57) ABSTRACT

An electric food smoker is disclosed that includes a smoker chamber for holding food to be smoked, a wood compartment for holding smoke producing material to generate smoke, a chamber coil in the smoker chamber to control cooking temperature, and a wood coil in the wood compartment to control temperature for generating smoke. The wood compartment is separated from the smoker chamber. The wood compartment can be located in and insulated from the smoker chamber. The wood compartment can have vents allowing smoke to exit into the smoker chamber. The wood coil can have multiple temperature settings to control the amount of smoke generated; or can have a high smoke setting for generating more smoke and a normal smoke setting for generating less smoke. The chamber coil can maintain the cooking temperature in the smoker chamber regardless of the temperature setting for the wood coil.

19 Claims, 4 Drawing Sheets

(56) References Cited

U.S. PATENT DOCUMENTS

| | | |
|---|---|---|
| 2008/0121632 A1 | 5/2008 | Wang |
| 2009/0136638 A1 | 5/2009 | Fujie et al. |
| 2011/0038990 A1 | 2/2011 | Hyun |
| 2013/0196038 A1 | 8/2013 | Liu |
| 2014/0216268 A1 | 8/2014 | Burch |
| 2014/0216273 A1 | 8/2014 | Burch |
| 2015/0025687 A1 | 1/2015 | Henderson et al. |
| 2015/0064314 A1 | 3/2015 | Briden et al. |
| 2016/0353929 A1 | 12/2016 | McLemore et al. |
| 2017/0020148 A1* | 1/2017 | Dixon .................... A23B 4/052 |

* cited by examiner

ELECTRIC SMOKER

FIELD OF THE DISCLOSURE

The present disclosure relates to smokers, and in particular to an electric smoker where wood or other aromatic smoke is generated in a chamber to flavor food being cooked in the smoker.

BACKGROUND

For many years, smokers have been used to infuse flavors into different types of food. A desired flavor is usually provided for the food by burning a smoke-producing material to produce smoke in a smoker chamber where the food is being prepared. Examples of smoke-producing materials include, but are not limited to, wood, saw dust, wood chips, wood pellets, or other material that produces a desired flavor. These are other smoke-producing materials will be referred to herein as wood. The wood is usually in a pan inside the smoker chamber and a heating coil is used to raise the temperature of the wood thereby causing it to emit smoke which transfers the desired flavor onto the food in the smoker chamber.

The temperature required to generate smoke from the wood is usually higher and different at variable times than the desired cooking temperature. Therefore, in the process to generate smoke, the smoker chamber cooking temperature is usually raised beyond acceptable levels for cooking. Generating a desired smoke level, or varying smoke levels, at acceptable cooking temperatures is nearly impossible with a single heating source providing the heat for both smoke generation and food cooking in the smoker chamber.

It would be desirable to have a smoker that has one heating element to heat the wood to a desired temperature, and a second heating element to provide the desired cooking temperature for the food inside the smoker chamber. It would also be desirable to have different embodiments of the system that can produce a user-selectable smoke level inside the smoker chamber. These and other features of the present invention will be described in the disclosure.

SUMMARY

An electric food smoker is disclosed that includes a smoker chamber, a wood compartment, a chamber coil, and a wood coil. The smoker chamber is for holding food to be smoked. The wood compartment is for holding smoke producing material to generate smoke; and the wood compartment is separated from the smoker chamber. The chamber coil is located in the smoker chamber and controls cooking temperature for food in the smoker chamber. The wood coil is located in the wood compartment and controls temperature for generating smoke. The wood compartment can be located in the smoker chamber, and the wood compartment can be insulated from the smoker chamber. The wood compartment can have multiple vents for allowing smoke to exit the wood compartment and enter the smoker chamber. The wood compartment can be insulated from the smoker chamber with glass fiber cotton.

The wood coil can have multiple temperature settings to control the amount of smoke generated in the wood compartment. For example, the wood coil can have a higher smoke setting for generating more smoke and a lower smoke setting for generating less smoke. The electric food smoker can also include a control panel that has smoke setting buttons or controls to vary the smoke level; where selection of a higher smoke setting button sets power to the wood coil at a first power level, and selection of a lower smoke setting button sets power to the wood coil at a second power level, where the second power level is less than the first power level. The first power level can be about 350 Watts and the second power level can be about 250 Watts. The chamber coil can maintain the cooking temperature in the smoker chamber regardless of the temperature setting for the wood coil. The control panel can include a selection for a desired cooking temperature for the smoker chamber, and the chamber coil can maintain the cooking temperature within plus or minus 3 degrees of the desired cooking temperature.

The electric food smoker can also include a wood tray for holding the smoke producing material in the wood compartment, where the wood tray is loadable without exposing the smoker chamber to outside air. The wood compartment can be attached to an outside wall of the smoker chamber, and the wood tray can be slideable in and out of the wood compartment through the outside wall of the smoker chamber. The wood compartment can be attached to two outside walls of the smoker chamber. The electric food smoker can also include a plurality of dampers for allowing air flow in and out of the smoker chamber. The smoker chamber can include a plurality of outside walls, and the plurality of dampers can include a first damper near the top of a first outside wall of the smoker chamber, and a second damper near the bottom of a second outside wall of the smoker chamber, where the first outside wall is opposite of the second outside wall.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
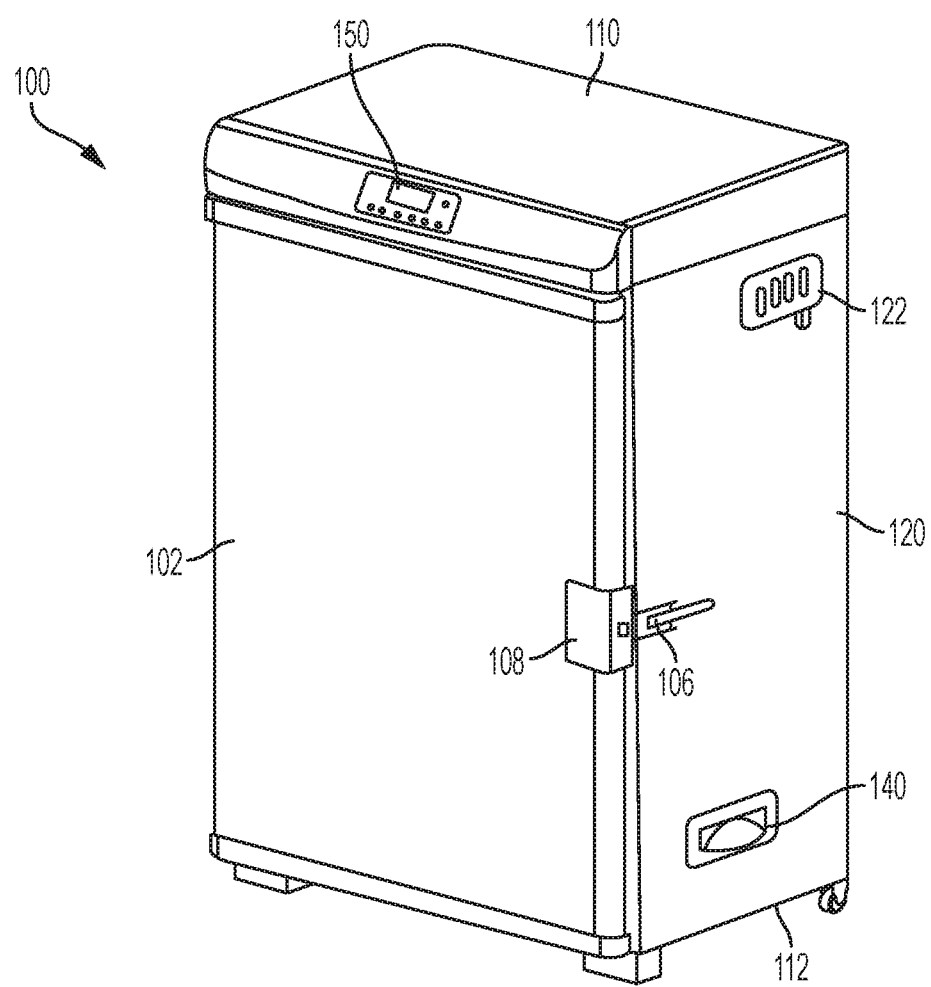
FIG. 1 illustrates an exemplary embodiment of an electric smoker with its door closed.
Figure 2:
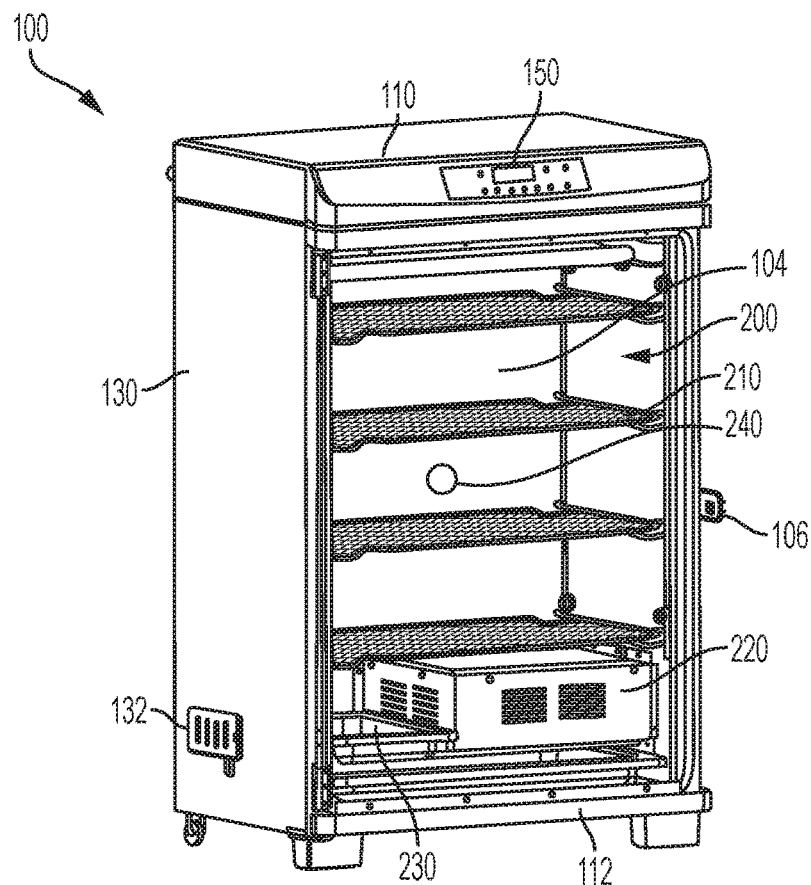
FIG. 2 illustrates an exemplary embodiment of an electric smoker with its door removed.

FIG. 1 illustrates an exemplary embodiment of an electric smoker 100 that shows a door 102, a top wall 110, a right side wall 120 and a bottom wall 112. FIG. 2 illustrates the exemplary embodiment of the electric smoker 100 with the door 102 removed to show the smoker chamber 200. FIG. 2 also shows the top wall 110, a left side wall 130. the bottom wall 112 and a rear wall 104. FIGS. 1 and 2 also show a movable latch handle 108, a latch mechanism 106, a first damper 122, a second damper 132, a wood tray handle 140, a control panel 150, shelves 210, a wood compartment 220 and a water pan 230.

When the door 102 is closed, the chamber 200 is enclosed by the door 102, the right side wall 120, the rear wall 104, the left side wall 130, the top wall 110, and the bottom wall 112. Food can be placed on the shelves 210 in the chamber 200 to be smoked. The movable latch handle 108 on the door 102 can interlock with the latch mechanism 106 on the right wall 120. The latch handle 108 can be moved to release from the latch mechanism 106 to open the door 102 to provide access to the chamber 200. The door 102 can be closed and the latch handle 108 latched to the latch mechanism 106 to keep the door 102 closed.

The embodiment of FIGS. 1 and 2 shows the first damper 122 near the top of the right side wall 120 and the second damper 132 near the bottom of the left side wall 130. The dampers 122, 132 can be partially or fully opened or closed to control air flow in and out of the smoker chamber 200 when the door 102 is closed. The smoker 100 can include additional dampers, and/or the dampers can be placed at different locations to control air flow in the chamber 200 of the smoker 100.

Figure 3:
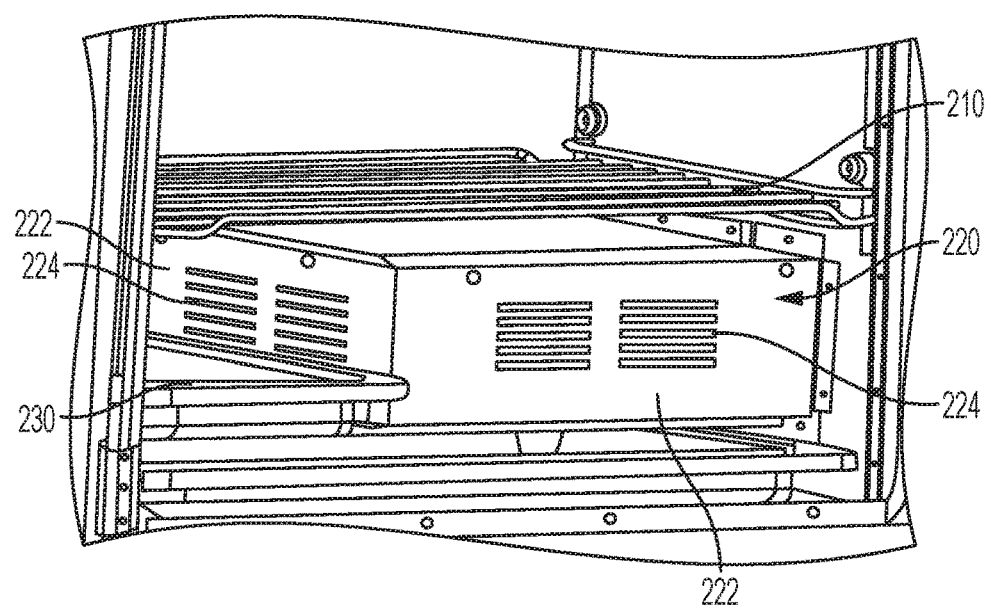
FIG. 3 illustrates a closer view of the wood compartment from the front of the smoker.
Figure 4:
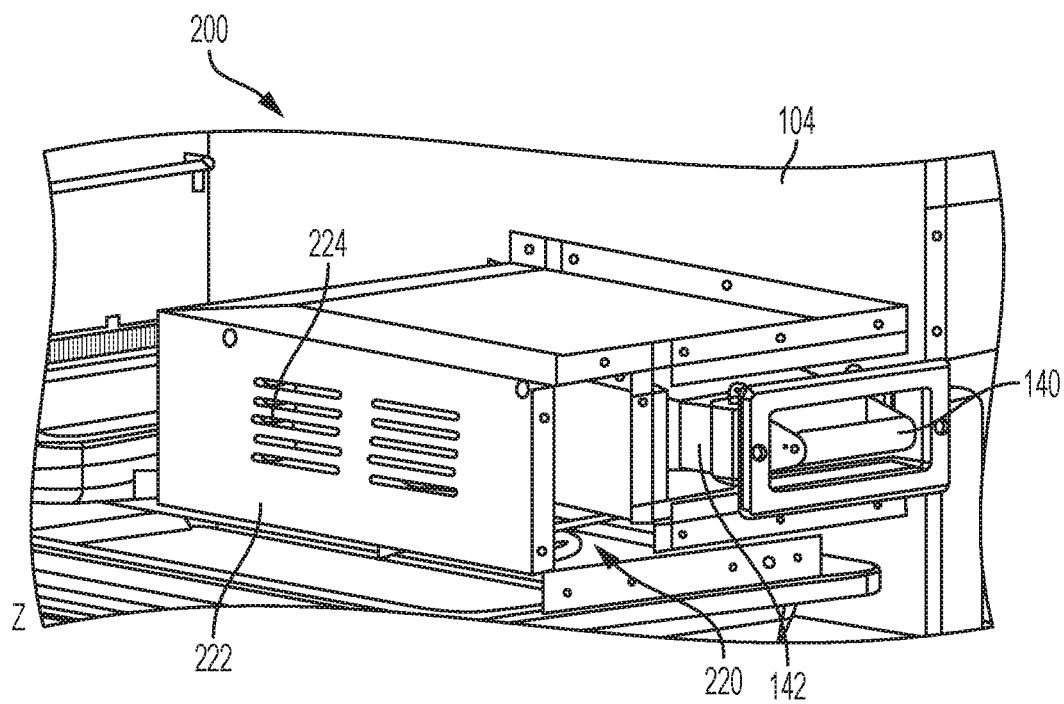
FIG. 4 illustrates a closer view of the wood compartment from the right side of the smoker with the right side wall removed.

The wood compartment 220 is encased and insulated from the chamber 200. FIG. 3 shows a closer view of the wood compartment 220 from the front of the smoker 100, and FIG. 4 shows a closer view of the wood compartment 220 from the right side of the smoker 100 with the right side wall 120 removed. The wood compartment 220 is attached to the right side wall 120 and the rear wall 104. The remaining sides (front, left, top and bottom) of the wood compartment 220 are enclosed by insulating walls 222. The insulating walls 222 of the wood compartment 220 can be insulated with an insulating material, for example glass fiber cotton, to limit the heat influence from the wood compartment 220 on the rest of the smoker chamber 200. The front and left walls 222 of the wood compartment 220 have vents 224 to allow the smoke generated inside the wood compartment 220 to come out into the chamber 200 where the food is located.

Figure 5:
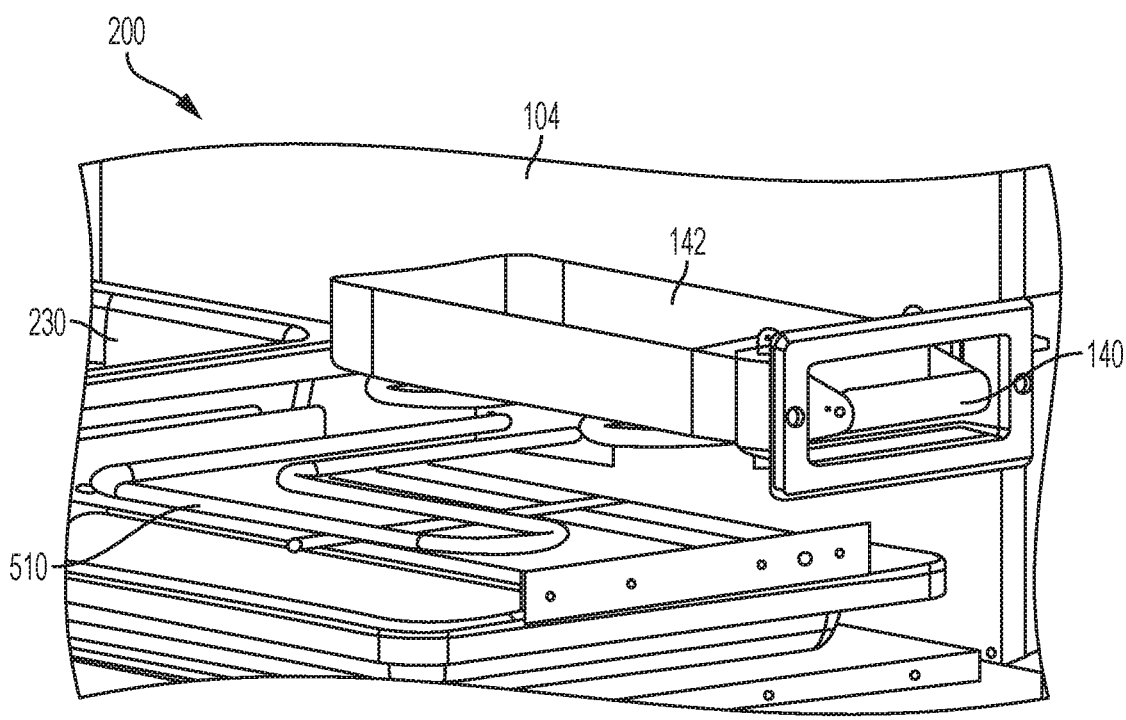
FIG. 5 illustrates a closer view of the wood compartment from the right side of the smoker with the right side wall removed and the insulating walls of the wood compartment removed.

FIG. 5 shows a similar view to FIG. 4, except in FIG. 5 both the right side wall 120 and the insulating walls 222 of the wood compartment 220 are removed. FIGS. 4 and 5 show a wood tray 142 which is attached to the wood tray handle 140 that extends out the right side wall 120. The wood tray handle 142 can be pulled to pull the wood tray 142 out of the wood compartment 220 through the right side wall 120 for adding wood (wood chips, pellets or other smoke-producing material). The wood tray 142 can then be pushed back into the wood compartment 220 so the wood can be heated to produce the desired smoke. The wood tray 142 can thus be reloaded with smoke producing material without interfering with the cooking temperature in the smoker chamber 200 by exposing the smoker chamber 200 to outside air, and with only minimal interfering with the smoke producing temperature in the wood compartment 220 by exposing the wood compartment 220 to outside air.

Figure 6:
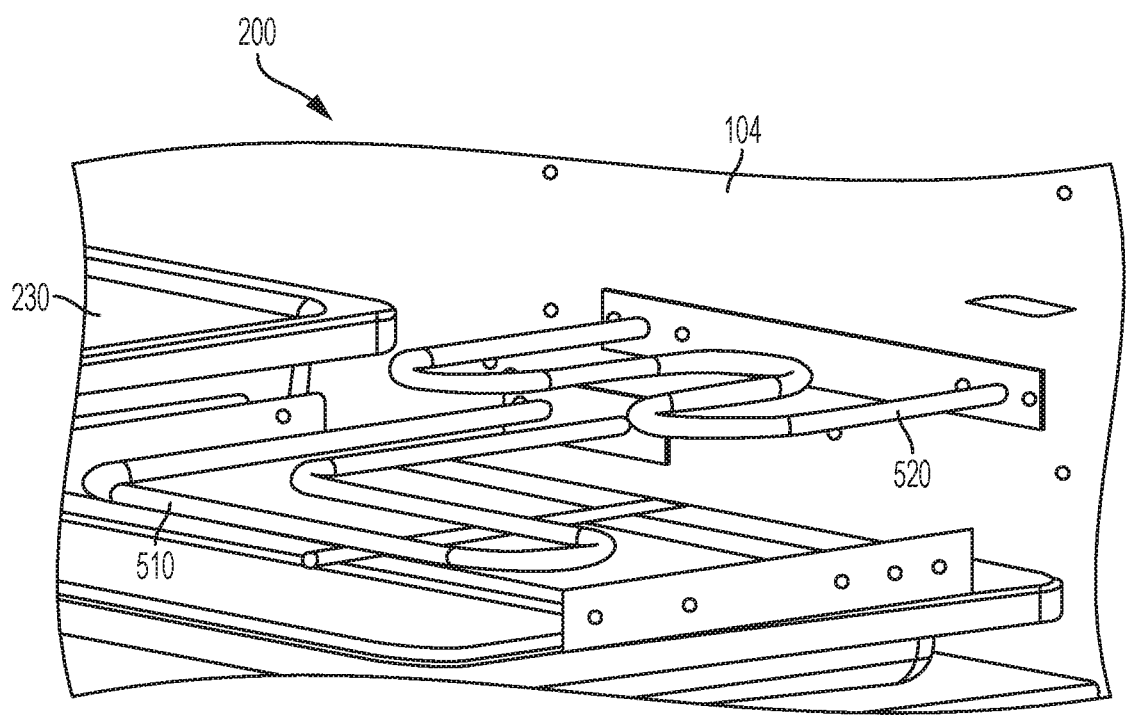
FIG. 6 illustrates a closer view of the wood compartment from the right side of the smoker with the right side wall removed, the insulating walls of the wood compartment removed, and the wood tray removed.

FIG. 6 shows a similar view to FIG. 5 with the wood tray 142 removed. FIGS. 5 and 6 show a chamber coil 510 and a wood coil 520. The wood coil 520 is located in the wood compartment 220 to provide the desired heat to produce smoke from the wood in the wood tray 142. The chamber coil 510 is in the smoker chamber 200 but outside of the wood compartment 200 to provide the desired cooking temperature for the food on the shelves 210 in the chamber 200. Both the chamber coil 510 and the wood coil 520 can be mounted on the rear wall 104.

Figure 7:
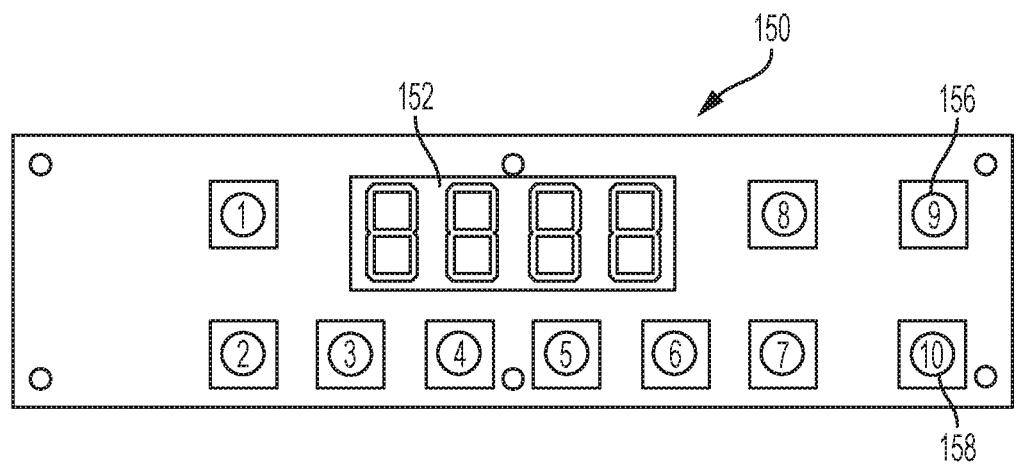
FIG. 7 illustrates an embodiment of a control panel for a smoker.

FIG. 7 shows an embodiment of the control panel 150 that can be mounted on the top wall 110 of the smoker 100. The control panel 150 includes a display 152 and various control setting buttons for user selection of smoker control values, for example cooking temperature, time, etc. The control setting buttons include a normal smoke setting button 156 and a high smoke setting button 158 that control the temperature of the wood coil 520 located in the wood compartment 220. When the normal smoke setting button 156 is selected the wood coil is set to a lower temperature and when the high smoke setting button 158 is selected the wood coil is set to a higher temperature. The wood in the wood tray 142 in the wood compartment 220 will produce less smoke at the lower temperature and more smoke at the higher temperature. The high smoke setting button 158 can select or cancel the high smoke mode, and the normal smoke setting button 156 can select or cancel the normal smoke mode.

The smoker 100 has a smoker chamber 200 for smoking different types of food products on the shelves 210, with a separate, insulated wood burning compartment 220 within the chamber 200. A chamber coil 510 controls the cooking temperature for the food on the shelves 210 in the chamber 200, and a separate wood coil 520 in the insulated wood compartment 220 controls the temperature for generating smoke from the wood in the wood compartment 220. One or more temperature sensor(s)/probe(s) 240 can be used to monitor the cooking temperature in the smoker chamber 200. Vents in the separate wood compartment 220 allow the generated smoke to come out of the wood compartment 220 and fill the chamber 200, while the insulated walls 222 of the wood compartment 220 reduce the impact of the higher temperature interior of the wood compartment 220 on the rest of the chamber 200.

In some embodiments, the user can select between multiple smoke levels ranging from a higher smoke level to a lower smoke level. The smoker can have "High Smoke" and "Normal Smoke" selectors/buttons, where one or the other or neither can be activated. Alternatively, the smoker can have a selector dial for continuous selectivity, or multiple buttons for discrete selectivity, of various smoke levels depending on their preference on the amount of smoke intended to be impacted on the food product. The higher or lower smoke levels operate at different heat levels of the wood coil 520 in the wood compartment 220. In conventional smokers where the heat source to control smoke level is not insulated from, or is the same as, the heat source to control cooking temperature, it is very difficult if not impossible to control both the smoke level and cooking temperature. The separate, insulated wood compartment 220 with its own wood coil 520 allows the user to control the amount of smoke generated for the smoker chamber 200, while the chamber coil 510 maintains a tight cooking temperature range, for example +/−3 degrees Fahrenheit. The higher and lower smoke level options have a flavoring effect on the food. The wood heating coil 520 can be encased, insulated, and separated in a way as to contain the heat emanating from the wood heating coil 520 from affecting the temperature in the food cooking chamber 200. The wood smoking compartment 220 can be insulated from the chamber 200 with various insulating materials, for example glass fiber cotton. The wood smoking compartment 220 can also have several holes or vents 224 for smoke to go through and enter the food cooking chamber 200.

The wood or chip coil 520 is insulated in the wood smoking compartment 220. An exemplary power range for the chip coil 520 is between 250 Watts (W) and 350 W. Other power ranges can be used for the chip coil 520 depending on the size of the wood compartment 220, distance from the wood in the wood tray 142, type of material (wood pieces, chips, pellets, sawdust, etc.) in the wood tray 142, and various other parameters. The chip heating coil 520 can be adjustable throughout its power range or can have some preset values within the range. In a high and low smoke level embodiment, for example, the high smoke button 158 can set the chip coil 520 to operate at about 350 W, and the normal smoke button 156 can set the chip coil 520 to operate at about 250 W. Other chip coil temperature settings can be preselected or selectable by the user.

Having the chip coil 520 encased in the wood compartment 220 not only helps in allowing separate smoke generation and cooking temperature control, but also helps to accumulate the heat in the smaller wood compartment 220 to aid in more efficient smoke generation and maintenance. The exemplary 250 W to 350 W power range for the wood coil 520 can be sufficient for generating smoke efficiently at lower temperatures in the smaller wood compartment 220, but may be insufficient for smoke generation in traditional smokers where the wood is in the larger food cooking area.

The chamber coil 510 is exposed in the smoker chamber 200 to control, adjust and maintain the cooking temperature in the smoker chamber 200. The temperature sensor(s) 240 can monitor the cooking temperature in the smoker chamber 200. An exemplary power range for the chamber coil 510 is from 800 W to 1400 W, and alternative power ranges can be used. The smoker 100 can be programmed to control power to the chamber coil 510, and hence coil temperature, to achieve and maintain the desired temperature setting in the smoker chamber 200 as reported by the temperature sensor(s) 240 within a relatively tight temperature range, for example ±3 degrees F. A programmable printed circuit board system can control and manage power to the chamber coil 510 to maintain the desired temperature in the smoker chamber 200. An example of power ranges using the 800 W to 1400 W embodiment can be:

| Chamber Temperature Range | Chamber Coil Power |
|---|---|
| 140 F. (60 C.)-180 F. (82 C.) | 200 W |
| 181 F. (83 C.)-210 F. (99 C.) | 400 W |
| 211 F. (100 F.)-230 F. (110 C.) | 800 W |
| 231 F. (111 C.)-300 F. (149 C.) | 1400 W |

The chamber and wood heating coils 510, 520 can either or both be programmed to cycle On/Off for a certain time duration, for example 4 minutes. This can help to control the smoke generation level and also prolong the wood burning life. When the desired level of smoke is reached, the wood heating coil 520 can be turned off and back on again per tested cycles to maintain the desired level of smoke.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. An electric food smoker comprising:
a smoker chamber for holding food to be smoked;
a wood compartment for holding smoke producing material to generate smoke; the wood compartment being separated from the smoker chamber;
a chamber coil located in the smoker chamber to control cooking temperature for food in the smoker chamber; and
a wood coil located in the wood compartment to control temperature for generating smoke;
wherein the wood compartment is located in the smoker chamber, and the wood compartment is insulated from the smoker chamber.

2. The electric food smoker of claim 1, wherein the wood compartment has multiple vents for allowing smoke to exit the wood compartment and enter the smoker chamber.

3. The electric food smoker of claim 2, wherein the wood compartment insulated from the smoker chamber with glass fiber cotton.

4. The electric food smoker of claim 2, further comprising a plurality of dampers for allowing air flow in and out of the smoker chamber.

5. The electric food smoker of claim 2, further comprising a wood tray for holding the smoke producing material in the wood compartment, the wood tray being loadable without exposing the smoker chamber to outside air.

6. The electric food smoker of claim 5, wherein the wood compartment is attached to an outside wall of the smoker chamber, and the wood tray is slideable in and out of the wood compartment through the outside wall of the smoker chamber.

7. The electric food smoker of claim 2, wherein the wood compartment is attached to two outside walls of the smoker chamber.

8. The electric food smoker of claim 2, wherein the wood coil has multiple temperature settings to control the amount of smoke generated in the wood compartment.

9. The electric food smoker of claim 8, further comprising a plurality of dampers for allowing air flow in and out of the smoker chamber.

10. The electric food smoker of claim 8, further comprising a wood tray for holding the smoke producing material in the wood compartment, the wood tray being loadable without exposing the smoker chamber to outside air.

11. The electric food smoker of claim 10, wherein the wood compartment is attached to an outside wall of the smoker chamber, and the wood tray is slideable in and out of the wood compartment through the outside wall of the smoker chamber.

12. The electric food smoker of claim 8, wherein the wood coil has multiple settings including a higher smoke setting for generating more smoke and a lower smoke setting for generating less smoke.

13. The electric food smoker of claim 12, further comprising a control panel having a high smoke setting button and a normal smoke setting button;
   wherein selection of the high smoke setting button sets power to the wood coil at a first power level, and selection of the normal smoke setting button sets power to the wood coil at a second power level, the second power level being less than the first power level.

14. The electric food smoker of claim 13, wherein the first power level is about 350 Watts and the second power level is about 250 Watts.

15. The electric food smoker of claim 8, wherein the chamber coil maintains the cooking temperature in the smoker chamber regardless of the temperature setting for the wood coil.

16. The electric food smoker of claim 15, further comprising a control panel for selecting a desired cooking temperature for the smoker chamber, and wherein the chamber coil maintains the cooking temperature within plus or minus 3 degrees of the desired cooking temperature.

17. The electric food smoker of claim 15, further comprising a plurality of dampers for allowing air flow in and out of the smoker chamber, and
   wherein the smoker chamber includes a plurality of outside walls, and the plurality of dampers include a first damper near the top of a first outside wall of the smoker chamber, and a second damper near the bottom of a second outside wall of the smoker chamber, the first outside wall being opposite of the second outside wall.

18. The electric food smoker of claim 15, further comprising a wood tray for holding the smoke producing material in the wood compartment, the wood tray being loadable without exposing the smoker chamber to outside air.

19. The electric food smoker of claim 18, wherein the wood compartment is attached to an outside wall of the smoker chamber, and the wood tray is slideable in and out of the wood compartment through the outside wall of the smoker chamber.

* * * * *